United States Patent
Pilard et al.

(10) Patent No.: US 8,611,196 B2
(45) Date of Patent: Dec. 17, 2013

(54) METHOD APPLYING A PULSED LASER BEAM FOR READING OF AN OPTICAL DISC AND RESPECTIVE APPARATUS

(75) Inventors: Gael Pilard, Wankheim (DE); Larisa Von Riewel, Mainaschaff (DE)

(73) Assignee: Thomson Licensing, Issy les Moulineaux (FR)

( * ) Notice: Subject to any disclaimer, the term of this patent is extended or adjusted under 35 U.S.C. 154(b) by 0 days.

(21) Appl. No.: 13/697,158

(22) PCT Filed: May 9, 2011

(86) PCT No.: PCT/EP2011/057369
§ 371 (c)(1), (2), (4) Date: Nov. 9, 2012

(87) PCT Pub. No.: WO2011/141397
PCT Pub. Date: Nov. 17, 2011

(65) Prior Publication Data
US 2013/0064056 A1 Mar. 14, 2013

(30) Foreign Application Priority Data
May 11, 2010 (EP) .................................. 10305495

(51) Int. Cl.
*G11B 7/24* (2013.01)
*G11B 7/0045* (2006.01)

(52) U.S. Cl.
USPC ................... 369/47.28; 369/59.12; 369/275.4

(58) Field of Classification Search
None
See application file for complete search history.

(56) References Cited

U.S. PATENT DOCUMENTS

| | | | |
|---|---|---|---|
| 5,390,156 A * | 2/1995 | Izumi et al. | 369/13.14 |
| 6,314,070 B1 | 11/2001 | Tanase et al. | |
| 6,999,392 B2 * | 2/2006 | Kato et al. | 369/59.11 |
| 7,330,415 B2 * | 2/2008 | Spruit et al. | 369/59.11 |
| 2001/0012251 A1 * | 8/2001 | Tanase et al. | 369/47.28 |
| 2006/0159001 A1 * | 7/2006 | Imanishi | 369/275.4 |
| 2013/0064056 A1 * | 3/2013 | Pilard et al. | 369/30.27 |

FOREIGN PATENT DOCUMENTS

WO WO2006004338 A1 1/2006

OTHER PUBLICATIONS

Pilard et al., WO 2009/109653, published Sep. 11, 2009.*

* cited by examiner

*Primary Examiner* — Peter Vincent Agustin
(74) *Attorney, Agent, or Firm* — International IP Law Group, PLLC

(57) ABSTRACT

Method for reading data from an optical disc comprising a substrate layer, a read-only data layer, and a nonlinear layer with a super-resolution structure disposed on the data layer, the read-only data layer including diffractive pits and lands having a length larger than the diffraction limit of the pickup and super-resolution pits and lands having a length smaller than the diffraction limit of the pickup, the method comprising the steps of using a pickup including a laser for providing a HF signal for retrieving of the data of the data layer, providing a constant laser power for retrieving of the data, and pulsing the laser at the end of a diffractive pit or land. The Apparatus comprises a pickup with a laser and a comparator responsive to a threshold level and to the HF signal, for providing a trigger signal for pulsing of the laser.

16 Claims, 4 Drawing Sheets

1

METHOD APPLYING A PULSED LASER BEAM FOR READING OF AN OPTICAL DISC AND RESPECTIVE APPARATUS

This application claims the benefit, under 35 U.S.C. §365 of International Application PCT/EP2011/057369, filed May 9, 2011, which was published in accordance with PCT Article 21(2) on Nov. 17, 2011 in English and which claims the benefit of European patent application No. 10305495.3, filed May 11, 2010.

TECHNICAL FIELD OF THE INVENTION

The present invention relates to a method for reading data from an optical disc comprising a substrate layer, a read-only data layer having a data structure arranged in tracks on the substrate layer, and a nonlinear layer with a super-resolution structure disposed on the data layer, and to a respective apparatus.

BACKGROUND OF THE INVENTION

Optical storage media are media in which data are stored in an optically readable manner, for example by means of a pickup comprising a laser for illuminating the optical storage medium and a photo-detector for detecting the reflected light of the laser beam when reading the data. In the meanwhile a large variety of optical storage media are available, which are operated with different laser wavelength, and which have different sizes for providing storage capacities from below one Gigabyte up to about 50 Gigabyte (GB). Digital data are stored in these media along tracks in one or more layers of the media.

The storage medium with the highest data capacity is at present the Blu-ray Disc, which allows to store up to 50 GB on a dual layer disc. Available formats are at present for example read-only BD-ROM, re-writable BD-RE and write once BD-R discs. For reading and writing of a Blu-ray Disc, a pickup with a laser wavelength of 405 nm is used. On the Blu-ray Disc a track pitch of 320 nm and a mark length from 2T to 8T, maximum 9T, is used, where T is the channel bit length, which corresponds with a minimum mark length of 138-160 nm.

The diffraction limit of optical instruments as described by the Abbe theory is about lambda/2NA, which is 238 nm for a Blu-ray type pickup with a wavelength lambda=405 nm and a numerical aperture NA=0.85. This theoretical minimal detectable length from the diffraction theory is corresponding to a period of the pattern function, which is formed of a pit and of a land having the same length. The smallest detectable element of such a system is a pit or a land having a length of about lambda/4NA, which corresponds for a Blu-ray type pickup with a length of 119 nm.

New optical storage media with a super-resolution structure offer the possibility to increase the data density of the optical storage medium by a factor of two to four in one dimension as compared with the Blu-ray Disc. This is possible by including a nonlinear layer, which is placed above a data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. For example, semiconductor materials can be used as a nonlinear layer, e.g. InSb, which show a higher reflectivity in the center part of the focused laser beam, and which center reflectivity is dependent on the pit structure of the corresponding data layer. Therefore, the super-resolution effect allows to record and read data stored in marks of an optical disc, which have a size below the optical resolution limit of lambda/4NA of a corresponding optical pickup.

The nonlinear layer is often called a super-resolution near-field structure (Super-RENS) layer because it is assumed that for some specific materials, the optical effect of reducing the effective spot size of the laser beam is based on a near-field interaction between the marks and spaces of the data layer and the nonlinear layer. Super-RENS optical discs comprising a super-resolution near-field structure formed of a metal oxide, a polymer compound or a phase-change layer comprising GeSbTe or AgInSbTe are known.

WO 2006/004338 discloses an apparatus comprising a pickup for reading data from a super-resolution optical disc, wherein the pickup provides a first beam having a light intensity being sufficient for providing a super-resolution effect and a second beam following the first beam having not the light intensity for providing the super-resolution effect. By taking into account a temporal delay between the reflected signal of the first beam and the reflected signal of the second beam, reflected light outside of a reproduction beam spot of the super-resolution area is excluded, thereby improving the reproduction signal characteristics of the HF-signal.

The publication "Phase transformation of an InSb surface induced by strong femtosecond laser pulses" by Shumay and Höfer, *Physical Review B*, Vol. 53, No. 23, 15 Jun. 1996, p. 15878-16884, describes how phase transformations can be triggered on an InSb surface by applying high power femtosecond laser pulses.

BRIEF DESCRIPTION OF THE INVENTION

The method concerns reading data from an optical disc, which comprises a substrate layer, a read-only data layer having a pit/land data structure arranged in tracks on the substrate layer, and a nonlinear layer with a super-resolution structure disposed on the data layer, the read-only data layer including diffractive pits and lands having a length larger than the diffraction limit of the pickup and super-resolution pits and lands having a length smaller than the diffraction limit of the pickup. The method comprises the steps of using a pickup including a laser for providing a HF signal for retrieving of the data of the data layer, providing a constant laser power for retrieving of the data, and pulsing the laser at the end of a diffractive pit or land.

In a preferred embodiment, a threshold level is provided for the HF signal for detecting the end of a diffractive pit or land, and pulsing the laser in response to the threshold level. The laser may be pulsed before, after or exactly at the end of a diffractive pit or land. The optical disc may comprise e.g. pits and lands having a size from 2T-8T or 9T, wherein T is a channel bit length. Larger respectively longer pits and lands with a size larger than 5T pits and lands generate higher amplitude variations with regard to the smaller pits and lands, and the threshold level can be adjusted therefore for example such, that only pits and lands having a length larger than 5T are detected by means of the threshold level. Pits of a size of 2T or 3T provide only small variations of the amplitude of the HF-signal, and are therefore difficult to detect when they follow a long pit respectively a long land. By pulsing the laser of the pickup at the end of a long pit or long land, the super-resolution effect on the optical disc can be increased therefore, which super-resolution effect is the only effect for detecting 2T and 3T pits and lands having a size below the optical resolution limit of the pickup. The detectability of the super-resolution pits and lands is therefore increased.

The laser of the pickup is pulsed only for a very short time, in a range of 1 ns or below 1 ns, so that the higher laser intensity of the laser pulse, in particular the center spot of the diffraction limited laser spot on the optical disc, which center spot has an intensity sufficient for providing the super-resolution effect for reading of the 2T and 3T pits and lands. When pulsing the laser, a laser pulse power is used e.g. which is larger than the average continuous laser power as used for reading of the data of the data layer, and results for example in a total laser power of more than a factor of 2 during the laser pulse.

The length of the laser pulse is in particular adjusted such that only a 2T land following a diffractive pit or a 2T land and a 2T pit following a diffractive pit, and/or a 2T pit following a diffractive land or a 2T pit and a 2T land following a diffractive land is covered by the center spot of the laser during reading of the optical disc.

The method is applied advantageously to super-resolution optical discs comprising a non-linear layer including InSb as a material responsible for causing the super-resolution effect, for which it is known that for a super-resolution land following a long diffractive pit, and correspondingly a super-resolution pit following the super-resolution land, are difficult to detect because of the small super-resolution effect. In such a case, the laser may be pulsed only at the end of a diffractive pit, but not at the end of a diffractive land, which reduces a load of the laser during operation. But the invention is applicable also to any other super-resolution discs using other materials for providing a super-resolution effect. Pulsing the laser at the end of a diffractive land and at the end of a diffractive pit is in particular useful for super-resolution optical discs utilizing a material for the super-resolution effect, which provides smaller read-out signals for the super-resolution pits and lands with regard to the material InSb, for example phase-change materials.

An apparatus for applying the method for reading data from an optical disc comprises a pickup with a laser for providing a HF signal and comparing means, for example a comparator, for comparing the HF-signal with a threshold level. The threshold level is selected such and the comparator arranged such that a trigger signal for applying the laser pulse is only generated, when the HF-signal proceeds from a low level to a high level for indicating the presence of a long diffractive pit.

Another threshold and another comparator may be arranged such, that a trigger signal for pulsing the laser is only generated, when the HF-signal proceeds from a high level to a low level for indicating the end of a long diffractive land. For detecting a long diffractive pit, a negative threshold level is used, for detecting a long diffractive land, a positive threshold level is used, with respect to the average level of the HF signal.

The invention has in particular the advantage, that the temperature load of the optical disc is not essentially increased. A higher super-resolution effect can be obtained of course also when the continuous wave power of the laser, is increased, but the continuous wave power has to be carefully selected for not damaging the data layer of the optical disc to obtain a long term stability of the optical disc for the read-out. Laser pulses having a pulse duration in the order of a tenth of a nanosecond can be provided already by pickups used in present Blu-ray Disc recorders being capable of 8× recording speed.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
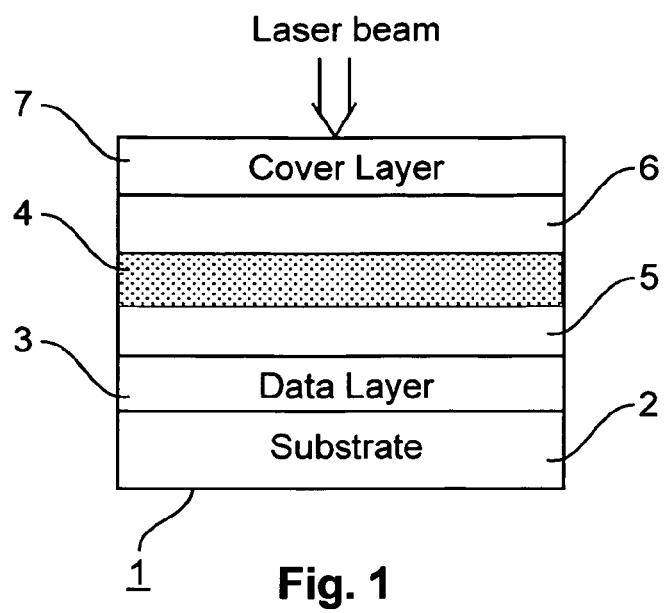
FIG. 1 an optical disc in a sectional view with a layer stack comprising a substrate, a data layer and a nonlinear layer, FIG. 2 a data signal of a data sequence of an InSb super-resolution optical disc rotating in normal rotation direction together with a data signal obtained when the optical disc is rotating in reverse direction, FIG. 3 the data signal of FIG. 2 for the normal rotation direction together with the mirrored data signal obtained when the optical disc is rotating in reverse direction, FIG. 4 diagrams depicting measured relative amplitudes of small and long pits of the optical disc according to FIG. 2, FIG. 5 a diagram for explaining the measurement results as shown in FIG. 2, FIG. 6 simulation of an HF signal for super-resolution structure comprising a diffractive pit followed by super-resolution lands and pits, and FIG. 7 a measured HF read-out signal of a super-resolution optical disc comprising a diffractive pit followed by super-resolution lands and pits, FIG. 8a a sequence of diffractive land and pits followed by a sequence of 2T pits and lands, and FIG. 8b a laser power applied to the pit/land structure of FIG. 8a according to the invention.

In FIG. 1 an optical storage medium 1 is shown in a cross section in a simplified manner. The optical storage medium 1 is in particular a read-only (ROM) optical storage disc. On a substrate 2 a data layer 3 is arranged which may comprise a reflective metallic layer, for example an aluminum layer. The data layer 3 has a data structure consisting of marks and spaces arranged on essentially parallel tracks. For a ROM disc, the marks and spaces consist of pits and lands, the pits being molded or embossed on the surface of substrate 2 for representing the data layer 3. On the data layer 3 a first dielectric layer 5 is arranged and on the dielectric layer 5 a nonlinear layer 4 is arranged for providing the function of a mask layer for utilizing a super-resolution effect. The nonlinear layer 4 comprises in particular a super-resolution structure for providing the super-resolution effect, e.g. a super-resolution near-field structure (Super-RENS).

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The optical storage medium 1 is in particular an optical disc having outside dimensions similar to DVDs and CDs. The first and second dielectric layers 5, 6 comprise for example the material $ZnS-SiO_2$. The substrate 2 and the cover layer 7 may consist of a plastic material, as known from DVDs and CDs. The layers of the storage medium 1 are arranged particularly as a layer stack. The nonlinear layer 4 comprises for example a semiconductor material of the III-V semiconductor family, e.g. GaSb, InAs or InSb, or a phase-change material, for example a chalcogenide material, as the super-resolution structure.

The super-resolution effect allows detecting pits, which have a size, in particular a length, which is below the optical resolution limit of a corresponding apparatus for reading of the data of the optical storage medium. It has been demonstrated that the super-resolution detection of an optical disc comprising a phase-change material, also other materials like semiconductor materials, is related to a local change of the optical properties of the nonlinear layer 4.

Recent experiments have shown that for some situations the smallest pits and lands, being below a resolution limit of a pickup for reading of the data, cannot be decoded correctly for an optical disc comprising a super-resolution structure, when they follow a large land, respectively a large pit. For example, when a 2T land, which is a land having a length being below the optical resolution limit of the pickup, follows a large pit, e.g. a 5T or 8T pit, the 2T land will not be detected by the pickup. This phenomenon can be seen in FIG. 2, which shows that a super-resolution pit being separated by a super-resolution land from a preceding large diffractive pit cannot be detected. The channel bit length T is for example 40 nm or 50 nm, a 2T pit and 2T land has therefore a length of 80 nm or 100 nm.

The optical resolution limit of a pickup for reading data of the optical storage medium can be defined as lambda/4NA, wherein lambda is the laser wavelength of the pickup and NA the numerical aperture of the pickup. The pits and lands of the optical storage medium having a size below the optical resolution limit are in particular 2T and 3T pits and lands, or 2T pits and lands, depending on the data density of the optical storage medium, wherein T is the channel bit length.

2T and/or 3T pits and lands having a length being below the optical resolution limit of the pickup will be called in this context super-resolution pits and lands, because they can be detected only by using a super-resolution effect. 5T-8T pits and lands have a length being above the resolution limit of the pickup are called in this context diffractive pits and lands, because for the detection a diffractive effect is effective, as known e.g. from Blu-ray Discs.

Figure 2:
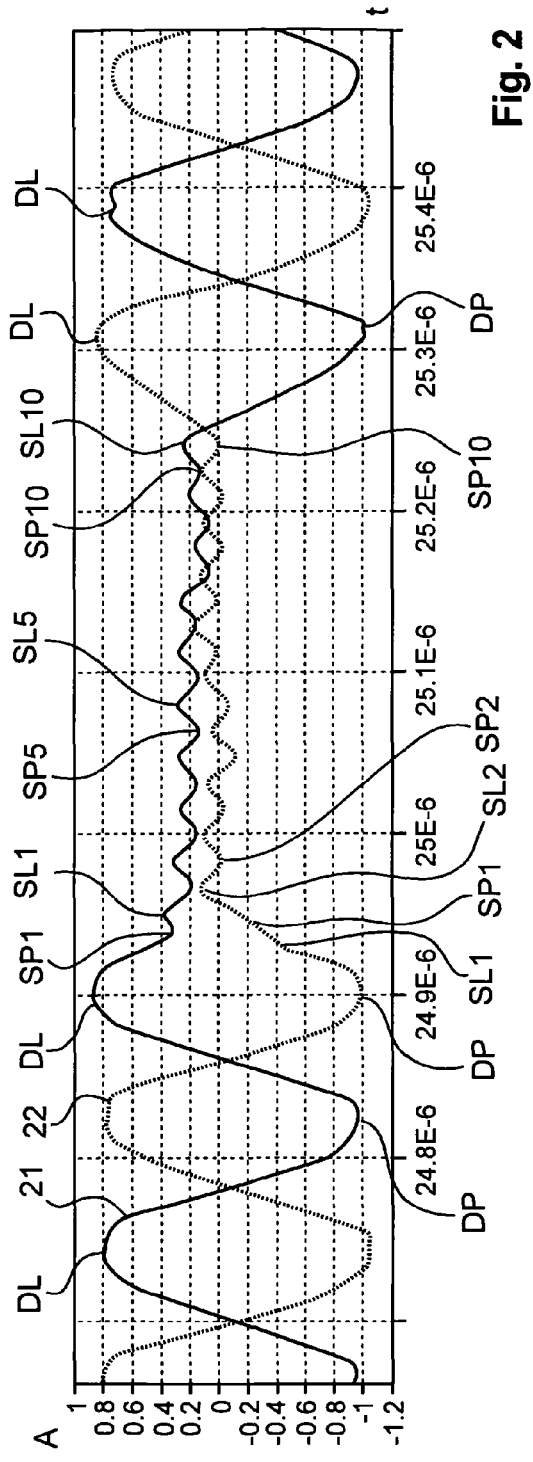

Graph 21 of FIG. 2 shows detection of a data sequence of alternatingly 10 pits SP1-SP10 and 10 lands SL1-SL10 having a length of each 80 nm, which are preceded by a 400 nm diffractive land DL and followed by a 400 nm diffractive pit DP. Shown is the amplitude A as a function of time t. The laser power is 2.8 mW. The data structure is arranged on an optical disc comprising a nonlinear layer provided by an InSb layer as the super-resolution structure. As can be seen, the first super-resolution pit SP1 following the diffractive land DF is clearly resolved, also the following sequence of super-resolution pits and lands. After the last super-resolution land SL10 follows the diffractive pit DP of length 400 nm, after which follows a diffractive land DL of same size.

But when the disc is rotated in reverse direction for reading the same sequence of super-resolution pits and lands, the situation is different: The sequence of the 10 super-resolution pits and lands begins with a super-resolution land SL1, after a preceding diffractive pit DP. The sequence of the 10 super-resolution pits and lands ends correspondingly with a super-resolution pit SP10 followed by a diffractive land DL. The data signal obtained with the pickup when reading the data in reverse direction, graph 22, is displayed in FIG. 2 in correspondence with the data signal of graph 21. As can be seen, after the last diffractive pit DP of graph 22 the signal amplitude is rising because super-resolution land SL1 is following, but the subsequent super-resolution pit SP1 is not resolved. Only the next super-resolution land SL2 is resolved, also the subsequent super-resolution pits and lands.

This is a surprising effect, because the super-resolution pit SP1 following a large diffractive land DL is clearly resolved as shown by graph 1, but the super-resolution pit SP1 following a large diffractive pit DP is not resolved according to graph 22. Correspondingly, also the super-resolution land SL1 between the diffractive pit DP and super-resolution pit SP1 is not detected. Normal rotation direction for reading of the user data is in particular in this embodiment the disc rotation with a counterclockwise rotation, and the reverse rotation direction is a clockwise rotation.

Figure 3:
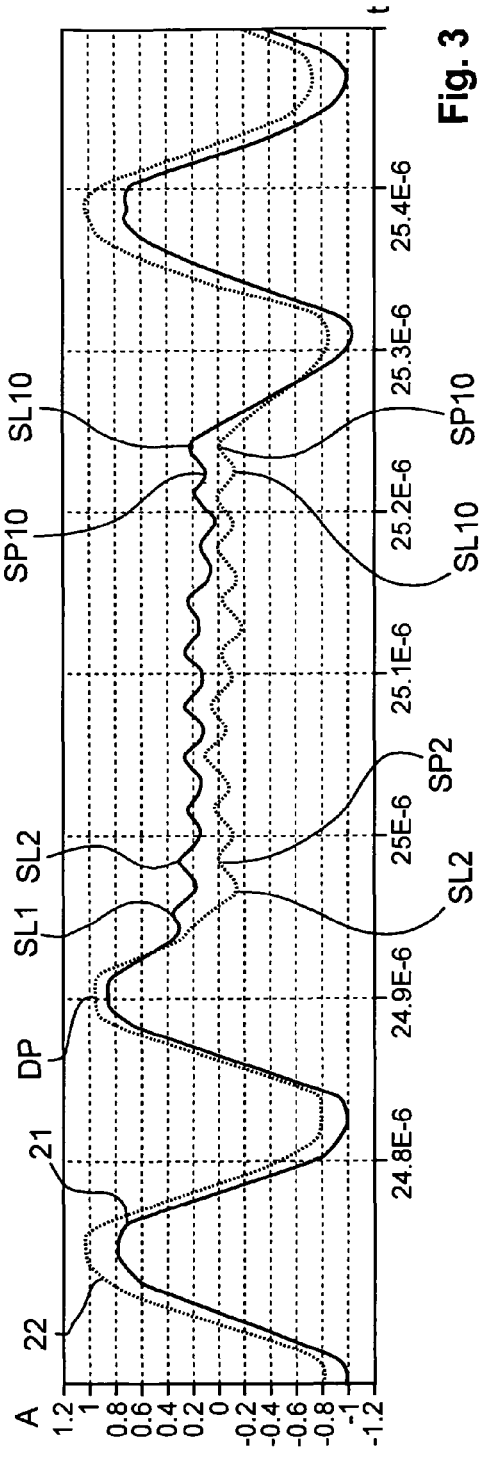

For a better comparison of graph 22 with graph 21, in FIG. 3 graph 22 is mirrored with regard to the amplitude and displayed together with graph 21, so that the signal of the pits and lands of graph 21 correspond with the signals of graph 22. Graph 22 of FIG. 3 confirms that the first super-resolution pit and first super-resolution land following a large diffractive pit are not detected by the pickup. Super-resolution land SL2 and super-resolution pit SP2 are detected, also the subsequent super-resolution pits SP3-SP10 and super-resolution lands SL3-SL10.

One of the reasons for this effect is, that the data signal obtained by the pickup for the super-resolution pits and lands is very small with regard to the data signals obtained for the diffractive pits and lands. The relative amplitudes of small and large pits have been measured and are displayed in FIG. 4, which shows the resolution R of pits as a function of the pit length L. The resolution is defined in this context as the amplitude of a pit of a given length, divided by the amplitude of a pit having a length of 600 nm. Investigated are pits beginning with a smallest pit length of 100 mn and including pits with stepwise increasing pit length of 50 nm up to the largest pit length of 600 nm. The pits are arranged on a super-resolution optical disc comprising InSb as the super-resolution material of the nonlinear layer.

Figure 4:
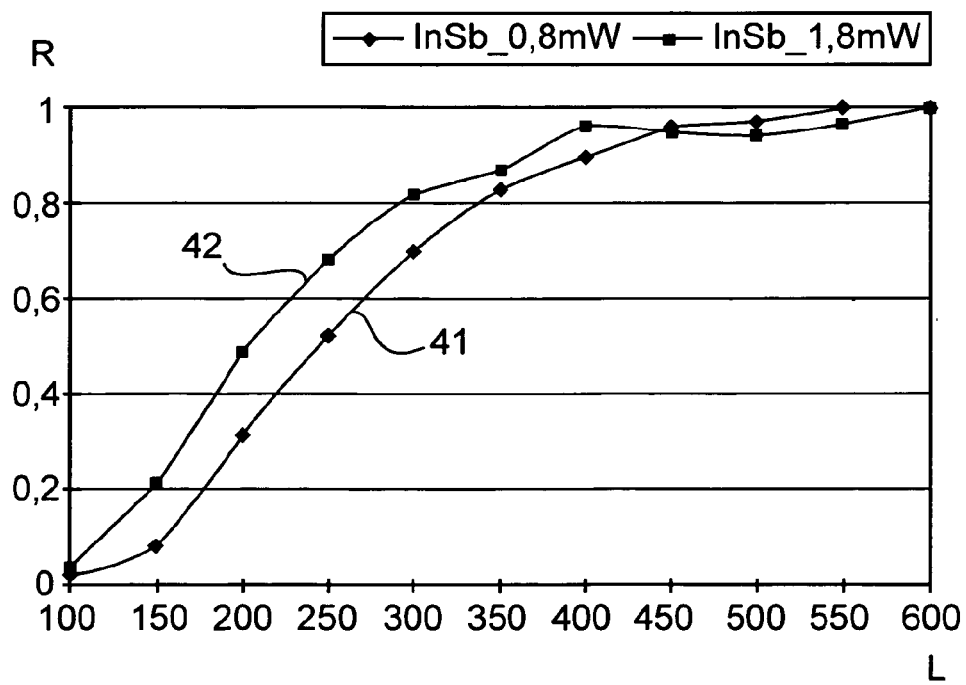

Graph 41 shows the resolution of the pits obtained when using a laser power of 0.8 mW, which is not sufficient for providing a super-resolution effect of the nonlinear layer. Graph 42 shows the resolution of the same pits when using a laser power of 1.8 mW, which is sufficient for providing a super-resolution effect. As can be seen in FIG. 4, the super-resolution effect is not only effective below the pit length of 150 nm, which is about the resolution limit of the pickup, but also for larger pit lengths. Further, for the pit length of 100 nm, the resolution R is very small in comparison with the larger pits, even for the laser power of 1.8 mW, and therefore the amplitude of the data signals obtained for super-resolution pits and lands of 100 nm length or below is correspondingly very small. The pickup used for these measurements, also for the other measurements of FIG. 2 and FIGS. 5-7, is a Blu-Ray type pickup having a laser wavelength of 405 nm and a numerical aperture NA=0.85. The resolution limit of this pickup is due to the diffraction theory correspondingly about 120 nm mark length, mark length being referred here to the length of a land or a pit.

Further, simulations for explaining the super-resolution effect have shown that the super-resolution effect is mainly provided by the super-resolution lands, and that the super-resolution pits provide only a comparatively small signal with regard to the super-resolution lands. This explains why a super-resolution land and a subsequent super-resolution pit following a large diffractive pit are not detected, as shown by graph 22 of FIG. 2.

Figure 5:
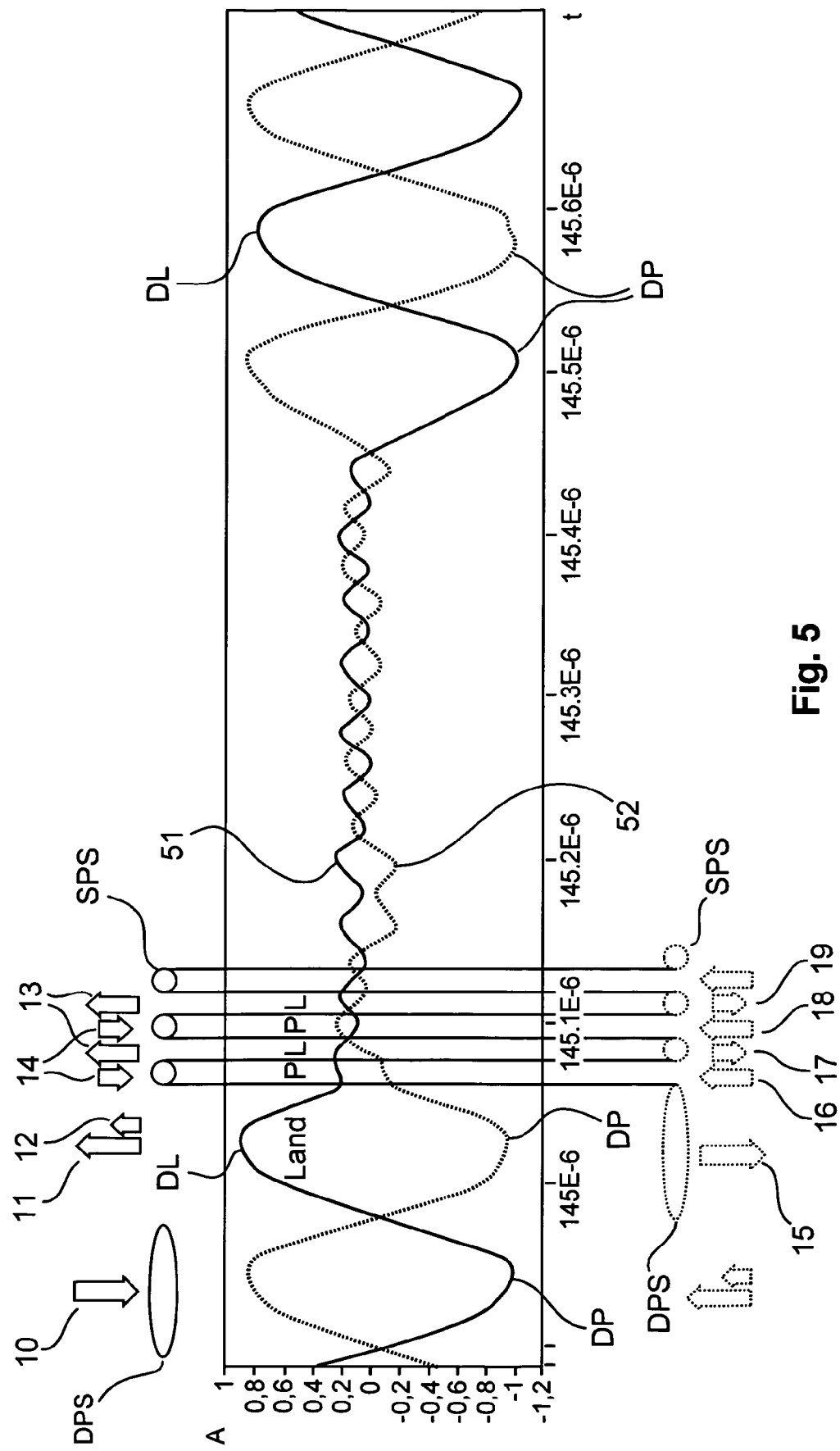
Figure 6:
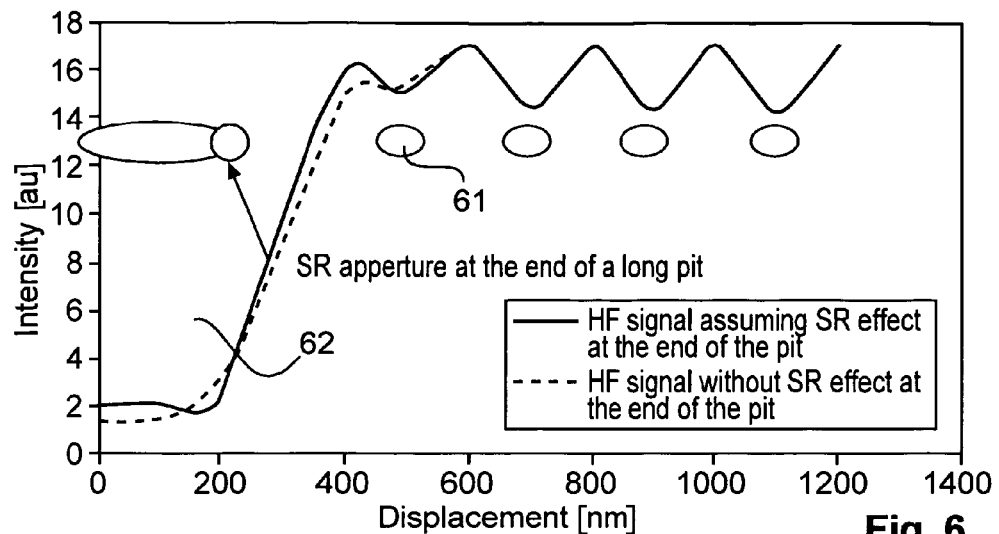

This effect is explained in more detail with regard to FIG. 5. Graph 51 shows a sequence of 10 super-resolution pits and 10 super-resolution lands, arranged between a preceding diffractive land DL and followed by a diffractive pit DP, similar to graph 21 of FIGS. 2 and 3. As a difference, the length of the super-resolution pits and lands is each 100 nm and the length of the diffractive pits and lands is each 400 nm. Graph 52 of FIG. 5 shows the data signal for these pits and lands, but using a reverse rotation of the optical disc. Again, the first super-resolution land and first super-resolution pit following the diffractive pit DP are not resolved during data reading in reverse direction, but only the subsequent super-resolution pits and lands, in agreement with FIG. 2.

Indicated in FIG. 5 is in addition the size DPS of the diffractive pits and the size SPS of the super-resolution pits. Also the corresponding reflectivity for the pits and lands is indicated by arrows, as originating from the diffractive effect and the super-resolution effect. The first diffractive pit DP, graph 51, provides a low reflectivity 10 and the subsequent diffractive land DL a high reflectivity 11. For the diffractive land DL, also reflectivity 12 is shown, provided in addition by the super-resolution effect, in accordance with FIG. 4. The super-resolution lands have also a higher reflectivity 13 and the super-resolution pits have a lower reflectivity 14, but for the super-resolution pits, the reflectivity 14 provides only a much smaller contribution to the data signal in comparison with the data signal of the super-resolution lands. This explains why the first super-resolution land after diffractive land DL is clearly resolved in graph 51 and therefore also the first super-resolution pit after diffractive land DL.

But the situation is different, when the disc is rotated in reverse direction, graph 52: The diffractive pit DP of size DPS provides a reflectivity 15. The first super-resolution land following this diffractive pit DP provides a large reflectivity 16 leading to a rise of the amplitude of the data signal, but the subsequent super-resolution pit provides only a small reflectivity 17 with regard to the reflectivity 16 of the preceding super-resolution land. The arrow corresponding with the amplitude of the reflectivity 17 is essentially smaller with regard to the arrow corresponding with the amplitude of the reflectivity 16. The amplitude of the data signal, graph 52, is therefore still increasing with the consequence, that the first super-resolution land and correspondingly also the first super-resolution pit of the super-resolution data sequence are not detected by the pickup, as can be recognized according to graph 52. Only the subsequent super-resolution land having reflectivity 18 and the subsequent super-resolution pit having reflectivity 19 are detected.

These effects could be confirmed by a simulation. For the simulation, a super-resolution aperture was opened at the end of a diffractive pit preceding a super-resolution land. The increase of super-resolution due to the first super-resolution land is strong in this case, but disappears if the super-resolution aperture is removed at the end of the preceding diffractive pit. The results of the simulation are shown on FIG. 6. As can be seen, a super-resolution effect of the first super-resolution pit 61 being equivalent with the super-resolution effect of the first super-resolution land following the diffractive pit 62 would provide a sufficient detectability for pit 61. Without the super-resolution effect, pit 61 cannot be resolved.

Figure 7:
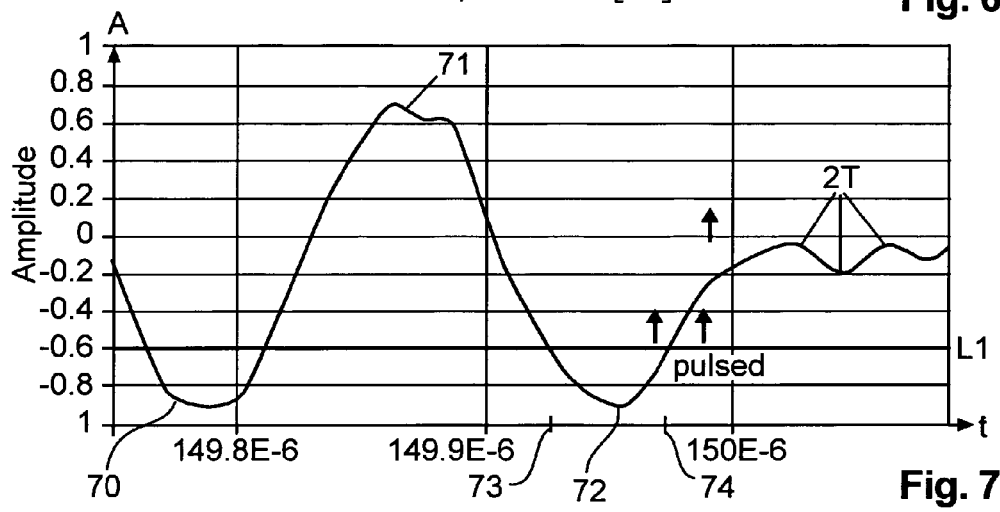

In FIG. 7, the HF read-out signal 70 of a pit/land structure of a super-resolution optical disc is depicted including a diffractive land 71 and a diffractive pit 72 being followed by a super-resolution pit/land structure of 2T pits and lands. As can be seen, the first 2T land and the first 2T pit following the diffractive pit 72 cannot be resolved. The HF signal 70 originates from a super-resolution optical disc including an InSb non-linear super-resolution layer having the function of a mask layer, and for reading of the data, a laser power of 2.9 mW was used.

To increase the detectability of super-resolution pits and lands following a diffractive pit or a diffractive land, the super-resolution effect is increased according to the invention. This can be done by increasing the laser power of the pickup by pulsing the laser in addition to the continuous laser power as used for reading of the data of the super-resolution optical disc. By pulsing the laser at the end of the diffractive pit 72, the super-resolution effect responsible for reading the subsequent 2T land and 2T pit is increased.

To detect a long, diffractive pit or land, advantageously a threshold level applied to the HF signal is used, which threshold level is adjusted such, that at the end of each diffractive pit or land a trigger signal is generated, which is applied to a power supply of the laser for increasing the laser power to provide an additional laser pulse for reading of subsequent 2T lands and pits with an increased super-resolution effect.

To detect the long diffractive pit 72, a threshold level L1 applied to the HF signal 70 is used, which threshold level L1 is adjusted such, that at the end of pit 72 a trigger signal is generated and applied to the power supply of the laser for increasing the laser power, to provide an additional laser pulse for reading of the subsequent 2T land and pit. The threshold level L1 for pulsing the laser of the pickup is indicated in FIG. 7.

Due to the long diffractive pit 72, the HF signal 70 falls below the threshold level L1 after the long diffractive land 71 and after the beginning of the diffractive pit 72 at a time 73, and at the end of diffractive pit 72 at a time 74, the HF signal 70 increases and crosses again the threshold level L1. By using for example a comparator responsive to the threshold level L1 and to the HF signal 70, a trigger signal for pulsing the laser of the pickup can be provided. The comparator can be designed for example such, that the output voltage of the comparator goes from "high" to "low" at time 73 and from "low" to "high" at time 74. The two times 73, 74 can be distinguished therefore easily according to the output voltage switching of the comparator.

Of course each long pit or land will cause the laser to be pulsed regardless of the following pits and lands, because there is no possibility to predict the subsequent data. But the threshold level L1 can be advantageously adjusted such, that only the longer diffractive pits are detected, but not smaller diffractive pits and lands. This reduces the load of the laser. It can be also advantageous, to include a delay for triggering the laser pulse, after the threshold level L1 is reached, to increase the super-resolution effect at a defined location after the diffractive pit 72. Alternatively, the threshold level L1 is advantageously adjusted such that the laser pulse begins already before the end of diffractive pit 72.

Figure 8A:
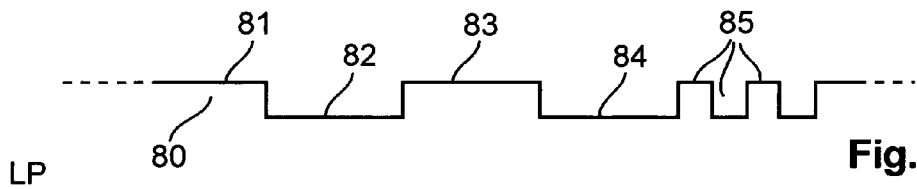

As indicated by arrows in FIG. 7, by pulsing the laser at the end of the diffractive pit 71, the super-resolution effect of the subsequent super-resolution land and pit is increased and the detectability improved correspondingly. This situation is explained in more detail now with regard to FIGS. 8a, 8b. Graph 80 of FIG. 8a shows a sequence of diffractive lands and diffractive pits 81-84, which are followed by a sequence of 2T pits and lands 85. Below graph 80 in FIG. 8b, graph 86 is located depicting the respective laser power LP for reading the pit/land structure shown as by graph 80. For the diffractive pits and lands 81-84, a continuous constant laser power LP is used. In addition, at the end of pit 82, the laser power LP is increased in addition for a defined time interval t1 by pulsing the laser, because the threshold level L1 will be triggered at the end of pit 82.

The laser power 85 will be increased again at the end of diffractive pit 84 for the defined time interval t1, in response to the threshold level L1. The time interval t1, during which the laser power LP is increased, is adjusted e.g. such, that the increased laser power is provided in particular for one 2T pit and one land following the diffractive pit 84. This will be sufficient for increasing the detectability of the 2T land and 2T pit following the diffractive pit 84.

The laser pulse P may start before the end, after the end or exactly at the end of a diffractive pit. The length of the time interval t1 is adjusted advantageously such that at least the inner beam spot of the laser beam focused on a respective track of the optical disc covers one 2T pit and/or one 2T land following the diffractive pit with the increased laser power. The laser power LP of the pulse P is in particular at least twice as much as the continuous laser power CW for providing a strong super-resolution effect.

Another threshold and another comparator may be arranged such, that a trigger signal for pulsing the laser is only generated, when the HF-signal proceeds from a high level to a low level to detect the end of a long diffractive land. To detect the end of the long diffractive land 71, a positive threshold level is required with regard to the average level of the HF signal 70. The average level of the HF signal 70 according to FIG. 7 is about −0.1. A positive threshold level of about 0.3 may be used therefore to detect the long diffractive lands included in the HF signal 70. To detect the long diffractive pits included in the HF signal 70, any negative threshold level within a range of −0.4 to −0.6 may be used.

Figure 8B:
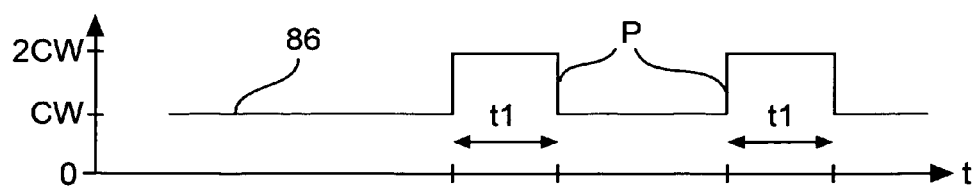

In a preferred embodiment, the apparatus for reading of the optical disc includes a pickup providing two laser beams, the first laser beam being a detector beam preceding the second beam, and wherein the second beam is designed for providing the HF data signal. The detector beam is used to detect the long diffractive pits and lands, and whether they are followed by super-resolution pits and lands. According to the data signal provided by the detector beam, the second beam is pulsed only, when super-resolution pits and lands are following a long diffractive pit or land. With such a pickup, it can be avoided that the laser power LP is pulsed at the end of diffractive pit 82, as indicated in FIG. 8b. By using such a pickup, the lifetime of the laser will be increased. The laser will be pulsed only when necessary.

Also other embodiments of the invention can be utilized by a person skilled in the art without departing from the scope of the present invention. The invention is in particular not limited to the materials as described with regard to the preceding embodiments. The invention resides therefore in the claims herein after appended.

The invention claimed is:

1. Method for reading data from an optical disc comprising a substrate layer, a read-only data layer having a pit/land data structure arranged in tracks on the substrate layer, and a nonlinear layer with a super-resolution structure disposed on the data layer, the read-only data layer including diffractive pits and lands having a length larger than the diffraction limit of the pickup and super-resolution pits and lands having a length smaller than the diffraction limit of the pickup, the method comprising the steps of
   using a pickup including a laser for providing a HF signal for retrieving of the data of the data layer,
   providing a constant laser power for retrieving of the data, and pulsing the laser at the end of a diffractive pit or land, and
   pulsing the laser at the end of a diffractive pit or land.

2. The method of claim 1, with the step of providing a threshold level for the HF signal for detecting the end of a diffractive pit or land, and pulsing the laser when the HF signal passes the threshold level.

3. The method of claim 1, wherein the smallest pits and lands have a length of 2T or 3T, T being a channel bit length, and pulsing the laser for a pulse duration corresponding with a length of 1T-5T on the optical disc.

4. The method of claim 1, with the step of using a laser pulse power being larger than the average constant laser power used for reading of the data of the data layer.

5. Apparatus comprising a pickup with a laser for applying a method in accordance with claim 1.

6. The apparatus of claim 5, comprising a comparator responsive to a threshold level and to the HF signal, for providing a trigger signal for pulsing of the laser.

7. The apparatus of claim 6, comprising a first comparator responsive to a positive threshold level and to the HF signal for detecting a diffractive land, and comprising a second comparator responsive to a negative threshold level and to the HF signal for detecting a diffractive pit.

8. The apparatus of claim 5, comprising a pickup providing two laser beams, the first laser beam being a detector beam preceding the second beam, the second beam being designed for providing the HF data signal, and the detector beam being designed to detect long diffractive pits and lands on a track of the optical disc, and whether they are followed by super-resolution pits and lands.

9. Method for reading data from an optical disc comprising a substrate layer, a read-only data layer having a pit/land data structure arranged in tracks on the substrate layer, and a nonlinear layer with a super-resolution structure disposed on the data layer, the read-only data layer including diffractive pits and lands having a length larger than the diffraction limit of the pickup and super-resolution pits and lands having a length smaller than the diffraction limit of the pickup, the method comprising the steps of
   using a pickup including a laser for providing a HF signal for retrieving of the data of the data layer,
   providing a constant laser power for retrieving of the data, and pulsing the laser at the end of a diffractive pit or land, and
   pulsing the laser before, after or exactly at the end of a diffractive pit or land.

10. The method of claim 9, with the step of providing a threshold level for the HF signal for detecting the end of a diffractive pit or land, and pulsing the laser when the HF signal passes the threshold level.

11. The method of claim 9, wherein the smallest pits and lands have a length of 2T or 3T, T being a channel bit length, and pulsing the laser for a pulse duration corresponding with a length of 1T-5T on the optical disc.

12. The method of claim 9, with the step of using a laser pulse power being larger than the average constant laser power used for reading of the data of the data layer.

13. Apparatus comprising a pickup with a laser for applying a method in accordance with claim 9.

14. The apparatus of claim 13, comprising a comparator responsive to a threshold level and to the HF signal, for providing a trigger signal for pulsing of the laser.

15. The apparatus of claim 14, comprising a first comparator responsive to a positive threshold level and to the HF signal for detecting a diffractive land, and comprising a second comparator responsive to a negative threshold level and to the HF signal for detecting a diffractive pit.

16. The apparatus of claim 14, comprising a pickup providing two laser beams, the first laser beam being a detector beam preceding the second beam, the second beam being designed for providing the HF data signal, and the detector beam being designed to detect long diffractive pits and lands on a track of the optical disc, and whether they are followed by super-resolution pits and lands.

* * * * *